United States Patent
Kalhan et al.

(10) Patent No.: US 11,102,726 B2
(45) Date of Patent: Aug. 24, 2021

(54) UPLINK TRANSMISSION POWER MANAGEMENT FOR UNMANNED AERIAL VEHICLES

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/652,533

(22) PCT Filed: Oct. 2, 2018

(86) PCT No.: PCT/US2018/053892
§ 371 (c)(1),
(2) Date: Mar. 31, 2020

(87) PCT Pub. No.: WO2019/074715
PCT Pub. Date: Apr. 18, 2019

(65) Prior Publication Data
US 2020/0288407 A1    Sep. 10, 2020

Related U.S. Application Data

(60) Provisional application No. 62/571,993, filed on Oct. 13, 2017, provisional application No. 62/697,563, filed on Jul. 13, 2018.

(51) Int. Cl.
*H04W 52/14* (2009.01)
*H04W 52/24* (2009.01)
(Continued)

(52) U.S. Cl.
CPC ....... *H04W 52/146* (2013.01); *H04W 52/243* (2013.01); *H04W 52/367* (2013.01); *H04W 72/082* (2013.01)

(58) Field of Classification Search
CPC .. H04W 52/146; H04W 52/243; H04W 52/14
(Continued)

(56) References Cited

U.S. PATENT DOCUMENTS

2011/0014940 A1*  1/2011  Zhang ............... H04W 52/146
                                                      455/522
2014/0133304 A1*  5/2014  Pica ..................... H04L 45/22
                                                      370/232
(Continued)

FOREIGN PATENT DOCUMENTS

KR    10-2009-0102419         1/2015

OTHER PUBLICATIONS

NTT Docomo; "Initial views on interference mitigation schemes for aerials," R1-1714582; 3GPP TSG RAN WG1 Meeting #90; Aug. 18, 2017; Prague, CZ.
(Continued)

*Primary Examiner* — John J Lee

(57) ABSTRACT

An unmanned aerial vehicle (UAV) user equipment (UE) device determines uplink transmission power based on a reduced power factor in response to receiving an interference indicator from a neighboring base station. The reduced power factor results in an uplink transmission power for an uplink signal that is less than the uplink transmission power based on a standard power factor.

22 Claims, 7 Drawing Sheets

(51) Int. Cl.
*H04W 52/36* (2009.01)
*H04W 72/08* (2009.01)

(58) Field of Classification Search
USPC .......... 455/522, 69, 501, 67.11, 422.1, 67.13
See application file for complete search history.

(56) References Cited

U.S. PATENT DOCUMENTS

2019/0208438 A1* 7/2019 Yang ................ H04L 43/16
2019/0229789 A1* 7/2019 Zhang ............... H04B 7/0617

OTHER PUBLICATIONS

Huawei, Hisilicon; "Potential enhancements for drones," R1-1714721; 3GPP TSG RAN WG1 Meeting #90; Aug. 21-25, 2017; Prague, CZ.
LG Electronics; "Interference Mitigation for Aerial Vehicles," R1-1717287; 3GPP TSG RAN WG1 Meeting #90bis; Sep. 29, 2017; Prague, CZ.

* cited by examiner

UPLINK TRANSMISSION POWER MANAGEMENT FOR UNMANNED AERIAL VEHICLES

CLAIM OF PRIORITY

The present application claims priority to U.S. Provisional Application No. 62/571,993 filed on Oct. 13, 2017, and U.S. Provisional Application No. 62/697,563 filed on Jul. 13, 2018, and assigned to the assignee hereof.

FIELD

This invention generally relates to wireless communications and more particularly to managing uplink transmission for unmanned aerial vehicles.

BACKGROUND

Aerial vehicles (AVs), such as drones, have received increasing interest in the past few years. AVs can be used to perform many different applications, including package delivery, real-time imaging, video surveillance, solar farm inspection, fire and storm assessment, search-and-rescue, monitoring of critical infrastructure, and wildlife conservation. Many of these emerging use cases could benefit from connecting the AV to a cellular network as a user equipment (UE) device.

SUMMARY

An unmanned aerial vehicle (UAV) user equipment (UE) device determines uplink transmission power based on a reduced power factor in response to receiving an interference indicator from a neighboring base station. The reduced power factor results in an uplink transmission power for an uplink signal that is less than the uplink transmission power based on a standard power factor. The standard power factor may be used by terrestrial UE devices for determining uplink transmission power. For some examples, the serving base station provides a power factor indicator indicating to the UAV UE device reduced power factor. In some circumstances, the power factor indicator indicates a power factor adjustment relative to the standard power factor. In other circumstances, the power factor indicator indicates a value of the reduced power factor. In other examples, the reduced UAV UE device stores at least one reduced power factor and autonomously uses the reduced power factor for power control in response to receiving the interference indicator.

DETAILED DESCRIPTION

Figure 1:
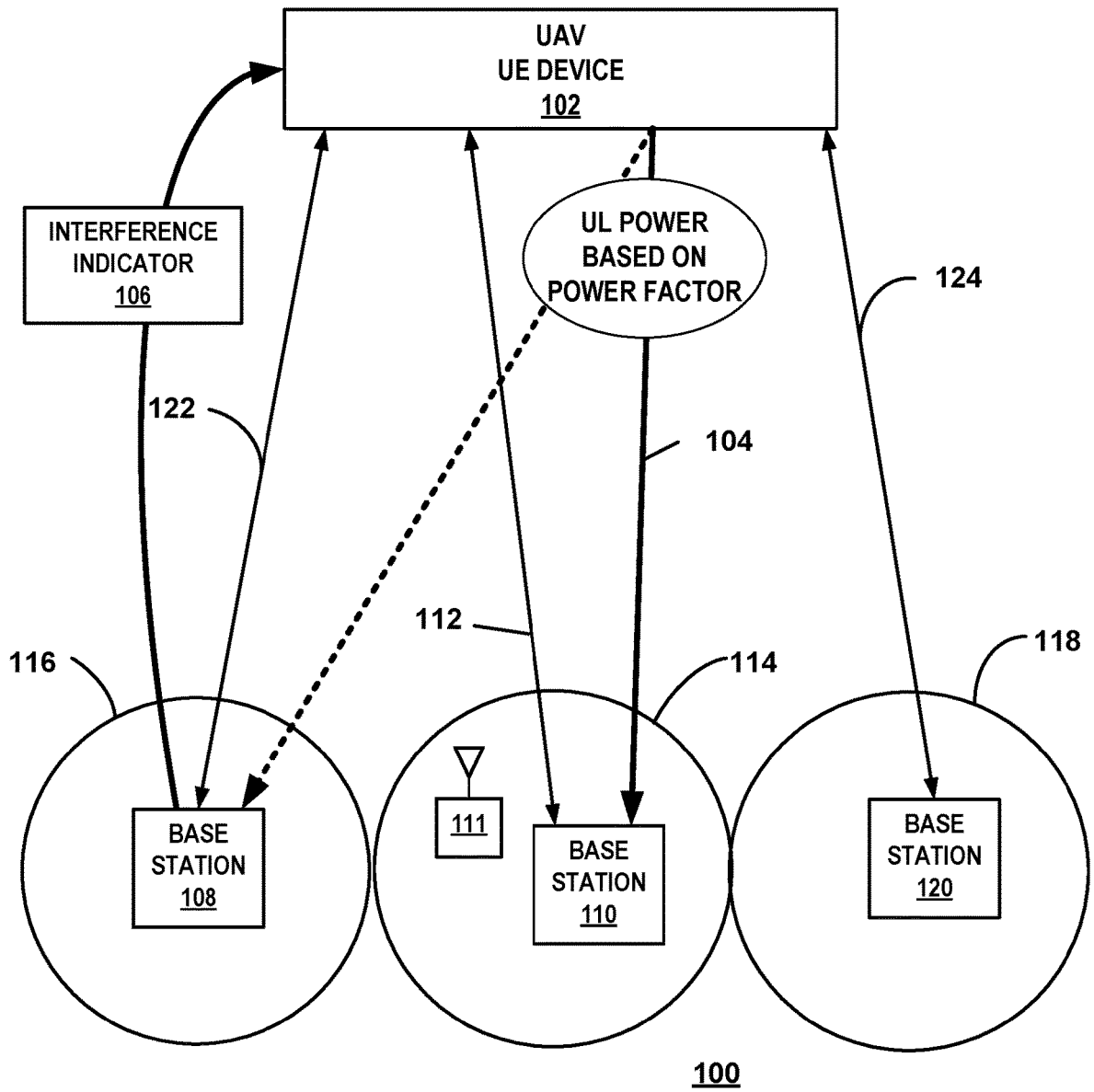
FIG. 1 is a block diagram of a communication system for an example where an unmanned aerial vehicle (UAV) user equipment (UE) device uses a reduced power factor for uplink transmissions after receiving an interference indicator from a non-serving base station.

There are a number of important considerations when connecting an unmanned aerial vehicle (UAV) to a network as a user equipment (UE) device. One example of a network to which the UAV can be connected is a 3rd Generation Partnership Project (3GPP) Long-Term Evolution (LTE) network. In other examples, the network is a fifth generation wireless system (5G) New Radio network. Regardless of the particular network to which the UAV connects, enhancements may be identified to better prepare the cellular networks for the data traffic growth from UAVs, such as drones, in the coming years.

When an unmanned aerial vehicle (UAV) is flying above the antennas of base stations, the uplink signal from the UAV user equipment (UE) device may be visible by multiple cells (base stations). In one scenario, the uplink signal from the UAV UE device may be considered as interference to neighboring cells which may impact services to UE terrestrial devices since the uplink radio resources allocated by the UAV UE device's serving cell are not orthogonal to the radio resources used by the neighbor cells. In other words, there is no intra-frequency resource coordination among the cells. To prevent such uplink interference, the network may vary the antenna beam pattern to steer away from the interfering UAV UE device where the cell is not the serving cell of the UAV UE device. The network can also steer the antenna beam pattern towards the UAV where the cell is the serving cell for the UAV UE device. Unfortunately, however, such antenna steering mechanisms are complicated and may impact services to terrestrial UE devices.

In addition, the uplink interference must be managed during handoffs. Due to uplink interference to the neighboring cells, it is important that the UAV's serving cell takes into account of such interference during handovers. For example, the serving cell could handover the UAV UE device to a cell that has the smallest uplink pathloss so that the UAV UE device's transmission power may be minimized which will also minimizes uplink interference to neighboring cells. In other cases, the UAV UE device's serving cell may try to allocate uplink resources not used by neighboring cells to avoid uplink interference. In both cases, however, tight network coordination is needed which may not be readily available. In some cases, network coordination may not even be possible due to the lack of backhaul link among cells. For example, X2 links may not exists. Without neighbor cell information, it is difficult for the serving cell to allocate orthogonal resources or optimize a handover.

For the examples herein, a method and system allow a serving cell to be informed of the neighbor cells' uplink interference condition without tight network coordination. An interference indicator is sent from a non-serving cell to the UAV UE device indicating to the UAV UE device that the uplink signals transmitted from the UAV UE device at standard power levels will result in interference at the non-serving base station. Therefore, the interference indicator indicates that UAV UE device's uplink transmission power should be reduced to reduce interference at the non-serving cell.

In the examples discussed herein, the UAV UE device bases open loop power control on a reduced power factor after receiving an interference indicator from a non-serving base station. In one example, the UAV UE device reports receipt of the interference indicator to its serving base station and then uses the lower power factor in response to an instruction received from the serving base station. In another example, the UAV UE device autonomously uses the lower power factor to determine uplink transmission power in response to receiving the interference indicator although the UAV UE device may also inform the serving base station of the received interference indicator.

FIG. 1 is a block diagram of a communication system 100 for an example where an unmanned aerial vehicle (UAV) user equipment (UE) device 102 uses a reduced power factor for uplink transmissions 104 after receiving an interference indicator 106 from a non-serving base station 108. The communication system 100 is part of a radio access network (not shown) that provides various wireless services to UE devices that are located within the respective service areas of the various base stations that are part of the radio access network. A serving base station 110 is connected to the network through a backhaul (not shown) in accordance with known techniques. The base station 110 provides wireless services to a UAV UE device 102 and to one or more terrestrial UE devices 111. The base station 110 communicates with the UAV UE device 102 via a wireless communication link 112.

The non-serving base station (neighboring base station) 108 is configured to transmit an interference indicator 106 to the UAV UE device 102 indicating uplink transmissions from the UAV UE device 102. In response to reception of the interference indicator 106, the UAV UE device 102 uses a reduced power factor for determining the uplink transmission power level. In one example, the UAV UE device 102 informs the serving base station 110 of the interference indicator 102 and serving base station 110 instructs the UAV UE device 102 to use the reduced power factor. In other situations, the UAV UE device 102 begins using the reduced power factor autonomously. For such situations, the UAV UE device 102 may also inform the serving base station when there is change in power factor.

Although the UAV UE device 102 is located above service area 114 of the base station 110 in FIG. 1, the base station 110, in this example, is the serving base station for the UAV UE device 102. For example, although the service areas 114, 116, 118 are shown as two-dimensional areas in FIG. 1, it is understood that for purposes of providing services to a UAV UE device 102, the service areas actually extend upwards to provide services to UAV UE devices that may be located at various altitudes above the service areas shown in FIG. 1. Specifically, the determination of which base station is used to serve the UAV UE device 102 in the Connected mode is controlled by the network according to multiple factors, such as loading of the neighboring base stations, the base station antenna configurations, and the downlink signal strength measurements reports from the UAV UE device 102. In this regard, it is worth noting that, similar to the coverage area that can be provided to traditional, terrestrial UE devices 111 by a base station, the coverage area that can be provided to a UAV UE device by a base station can also be affected by distance, environmental conditions, obstructions, and interference.

In the example shown in FIG. 1, the communication link 112 is a Uu link between the UAV UE device 102 and the base station (eNB) 110. The communication link 112 is configured to provide downlink communication from the base station 110 to the UAV UE device 102 and to provide uplink communication from the UAV UE device 102 to the base station 110.

In the interest of clarity and brevity, communication system 100 is shown as having only two neighboring base stations 108, 120, which provide wireless services to UE devices located within their respective service areas 118, 120. In other examples, however, the communication system 100 could have any suitable number of base stations. In the example shown in FIG. 1, base station 110 is considered to be a serving base station since it is providing wireless services to the UAV UE device 102. Neighboring base stations 108, 120 are also capable of providing wireless services to the UAV UE device 102 via their respective communication links 122, 124, if the UAV UE device 102 is handed over to one of the neighboring base stations 122, 124. Communication links 122, 124 are similar to communication link 112. If, for example, the UAV UE device 102 is handed over to neighboring base station 108, then neighboring base station 108 would become the serving base station, and base station 102 would become a neighboring base station. For the purposes of the examples described herein, base stations are considered to be neighboring each other if they are relatively close to each other and/or the UAV UE device 102 can simultaneously receive signals from each of the neighboring base stations at a given time.

The base station 110, which is sometimes referred to as an eNodeB or eNB, communicates with the UAV UE device 102 by transmitting downlink signals via communication link 112. In the case of 5G based on 5th Generation Wireless System (5G) new radio network communication specification, the base station is sometimes referred to as a gNB. The base station 110 also receives uplink signals transmitted from the UAV UE device 102 via communication link 112. As used herein, the terms "base station" and "cell" are interchangeable. In some cases, the serving cell is provided by a first base station, and the neighboring cell is provided by a second base station. However, in other cases, a serving cell and a neighboring cell may be provided by the same base station.

During operation, the serving base station 110 provides wireless services to UAV UE device 102 via the communication link 112. Due to the altitude at which the UAV UE device 102 operates, the uplink transmissions from the UAV UE device 102 may cause interference with one or more neighboring base stations 108, 120. In many situations, the interference may occur more easily than with terrestrial UE devices. More specifically, the uplink data transmissions from UAV UE device 102 may interfere with the uplink data transmissions being transmitted by UE devices located within the respective service areas 116, 118 of the neighboring base stations 108, 120. As mentioned above, the examples described herein include a method and a system for managing uplink transmission power of signals transmitted by the UAV UE devices to reduce interference while minimizing the impact on performance.

When particular criteria are met, a non-serving base station (neighboring base station) 108 transmits an interference indicator 106. In some situations, the criteria are related to the interference caused at the non-serving base station by uplink transmissions from a UAV UE device and can include parameters based on signal power, interference ratios, error parameters, other measurements and combinations of parameters. The criteria may also include traffic load parameters at the non-serving base station 108 and interference caused by other UAV UE devices. For example, the criteria may include the level of Interference-over-Thermal (IoT) resulting from various interfering sources. Although the criteria may be based on a combination of parameters, measurements or situations, the criteria may include only a single parameter. For example, a base station may transmit the interference indicator 106 when the Interference-over-Thermal (IoT) level has exceeded a threshold. Therefore, in some situations, a base station may transmit an interference indicator 106 without evaluating any uplink signals transmitted from a particular UAV UE device.

An example of a suitable technique for transmitting the interference indicator 106 includes using a common signaling channel or broadcast signal (e.g., System Information Block or SIB). In one example, therefore, the interference indicator 106 is transmitted over SIB. In another example, the interference indicator 106 is transmitted over the Multicast-Broadcast Single Frequency Network (MBSFN) channel since the existing MBSFN channel is primarily used for broadcast of the same information by many cells within a single frequency network. The MBSFN, however, is not limited to broadcast-multicast service as MBSFN subframes and may also be used for Unicast downlink delivery. One advantage of using MBSFN is that the UAV UE devices are already capable of receiving MBSFN transmissions and it is not necessary for the UAV UE device 102 to tune-away to monitor each neighboring cells' downlink transmissions. Since the UAV UE device's power consumption is also crucial to its operation, avoiding the requirement of tuning to different downlink frequency is an advantage.

In some circumstances, the interference indicator 106 simply indicates that interference is present. In other circumstances, the interference indicator 106 can provide a level of interference. As discussed below, such information can provide an indication of which reduced power factor should be used when more than one reduced power factor is available. In still other circumstances, the interference indicator may indicate that interference will be present with standard operation and may simply indicate that the UAV should limit transmission power. This may be a situation, for example, where the base station has determined that the IoT threshold has been exceeded at the base station where interference may or may not be due to UAV UE devices.

In response to receiving the interference indicator 106, the UAV UE device 102 applies a reduced power factor in determining uplink transmission power. In some examples, the UAV UE device uses a reduced power factor without additional instruction from its serving base station 110 while, in other examples, the UAV UE device 102 informs the serving base station 110 and receives instruction regarding using the reduced power factor. The base station 110 may also provide the value of the power factor.

In many wireless communication systems, such as Long Term Evolution (LTE) systems, uplink transmission power of the UE device is based on an open loop power control equation. An open loop power control equation for systems operating in accordance with LTE is discussed in 3GPP TS 36.213, Section 5.1, "Uplink power control". One approach to reduce interference to the neighboring cell includes lowering the UAV UE device uplink transmit power. In general, the open loop power control is proportional to the cell specific power factor value, $P_0$, and the propagation path-loss between the UAV UE device 102 and the serving base station 110. The UAV UE device, therefore, can lower uplink transmission power by using a different $P_0$ (lower) value compared to the standard power factor $P_0$ used by the terrestrial UE devices. A discussed herein, a standard power factor $P_0$ is referred to as a terrestrial power factor $P_{0\_TERRESTRIAL}$ and a reduced power factor $P_0$ used by UAV UE devices (when appropriate) is referred to as a reduced power factor, $P_{0\_UAV}$. In some situations, more than one reduced power factor value may be available and can be referred to as $P_{0\_UAV1}$, $P_{0\_UAV2}$, $P_{0\_UAV3}$, etc.

Reducing the uplink transmission power level of UAV UE devices by using a reduced power factor in order to lower the interference to the neighboring cells, however, comes at the expense of reduced performance. Therefore, it is preferable to avoid the lower $P_{0\_UAV}$ based power control unless it is necessary. As result, for the examples discussed herein, the reduced power level $P_{0\_UAV}$ is used only when a non-serving cell transmits an interference indicator and received by the UAV UE device 102.

Figure 2A:
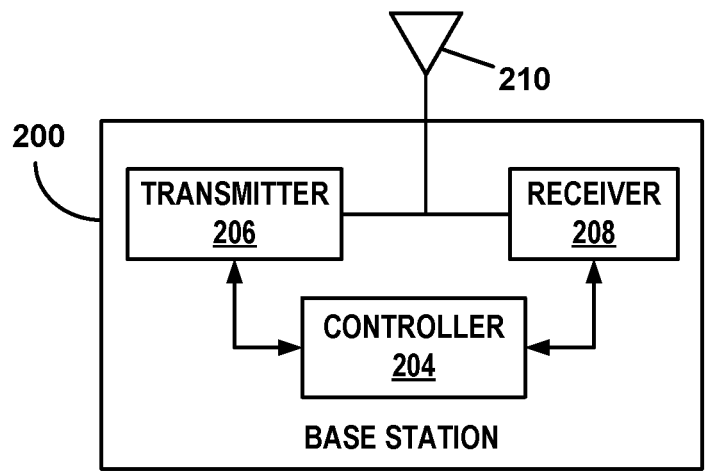
FIG. 2A is a block diagram of a base station suitable for use as a serving base station or neighboring base station, such as the base stations discussed above.

FIG. 2A is a block diagram of a base station 200 suitable for use as a serving base station or neighboring base station, such as the base stations 108, 110, 120 discussed above. Therefore, the example of FIG. 2A shows the circuitry and configuration of serving base station 110 where the same base station circuitry and configuration can be utilized for neighboring base stations 108, 120 in the example of FIG. 1. In other examples, either of the base stations may have circuitry and/or a configuration that differs from that of the serving base station 110 shown in FIG. 2A. The base station 200 comprises a controller 204, a transmitter 206, and a receiver 208, as well as other electronics, hardware, and code. The base station 200 is any fixed, mobile, or portable equipment that performs the functions described herein. The various functions and operations of the blocks described with reference to the base station 110 (200) may be implemented in any number of devices, circuits, or elements. Two or more of the functional blocks may be integrated in a single device, and the functions described as performed in any single device may be implemented over several devices.

For the example of FIG. 2A, the base station 200 may be a fixed device or apparatus that is installed at a particular location at the time of system deployment. Examples of such equipment include fixed base stations or fixed transceiver stations. In some situations, the base station 200 may be mobile equipment that is temporarily installed at a particular location. Some examples of such equipment include mobile transceiver stations that may include power generating equipment, such as electric generators, solar panels, and/or batteries. Larger and heavier versions of such equipment may be transported by trailer. In still other situations, the base station 200 may be a portable device that is not fixed to any particular location. Accordingly, the base station 200 may be a portable user device, such as a UE device, in some circumstances.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components, such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the downlink signals to be transmitted via communication link 112 and, in so doing, can apply any one of a plurality of modulation orders. The demodulator demodulates any uplink signals received at the base station 200 in accordance with one of a plurality of modulation orders.

Figure 2B:
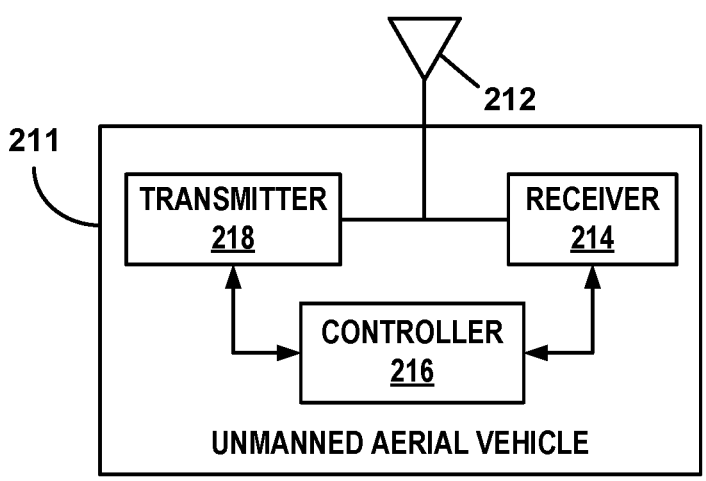
FIG. 2B is a block diagram of an unmanned aerial vehicle (UAV) user equipment (UE) device suitable for use as the UAV UE device in the example of FIG. 1.

FIG. 2B is a block diagram of an unmanned aerial vehicle (UAV) user equipment (UE) device 211 suitable for use as the UAV UE device 102 in the example of FIG. 1. For the example of FIG. 2B, the UAV UE device electronics are configured to communicate directly with a base station, such as the base stations 108, 110, 120. For example, where the UAV UE device 211 is a UAV UE device 108, the UAV UE device 211 receives downlink signals via communication link 112 using antenna 212 and receiver 214. The UAV UE device 211 transmits uplink signals with transmitter 218 and antenna 212.

In addition to the antenna 212, receiver 214 and transmitter 218, the UAV UE device 211 further comprises a controller 216, as well as other electronics, hardware, and code. The UAV UE device 211 is any fixed, mobile, or portable equipment that performs the functions described herein. The various functions and operations of the blocks described with reference to the UAV UE device 211 (102) may be implemented in any number of devices, circuits, or elements. Two or more of the functional blocks may be integrated in a single device, and the functions described as performed in any single device may be implemented over several devices.

For the examples described herein, the UAV UE device 211 (102) is any wireless communication device that is capable of flight without having a human pilot aboard. In some examples, UAV UE device 211 (102) may be connected to an Evolved Universal Mobile Telecommunications System Terrestrial Radio Access Network (E-UTRAN) when flying and when on the ground. A drone would be one example of UAV UE devices 211, 102. In the instances where the UAV UE device 211 (102) is a drone, the flight of the UAV UE device 211 may operate with various degrees of autonomy, either under remote control by a human operator, autonomously by an onboard computer, or autonomously by a remote computer. In other cases, the UAV UE device 211 (102) may be a kite whose height can be manually adjusted by a human operator. In still other cases, the UAV UE device 211 (102) may be a kite whose height can be adjusted by an adjustable mechanized tether, which can be controlled by a human operator, by a programmed algorithm, or by the UAV UE device 211 (102) itself. Other UAV devices may include weather balloons.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components, such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UAV UE device 211 (108).

The transmitter 218 includes a modulator (not shown), and the receiver 214 includes a demodulator (not shown). The modulator can apply any one of a plurality of modulation orders to modulate signals prior to transmission. The demodulator demodulates received signals in accordance with one of a plurality of modulation orders.

Figure 3:
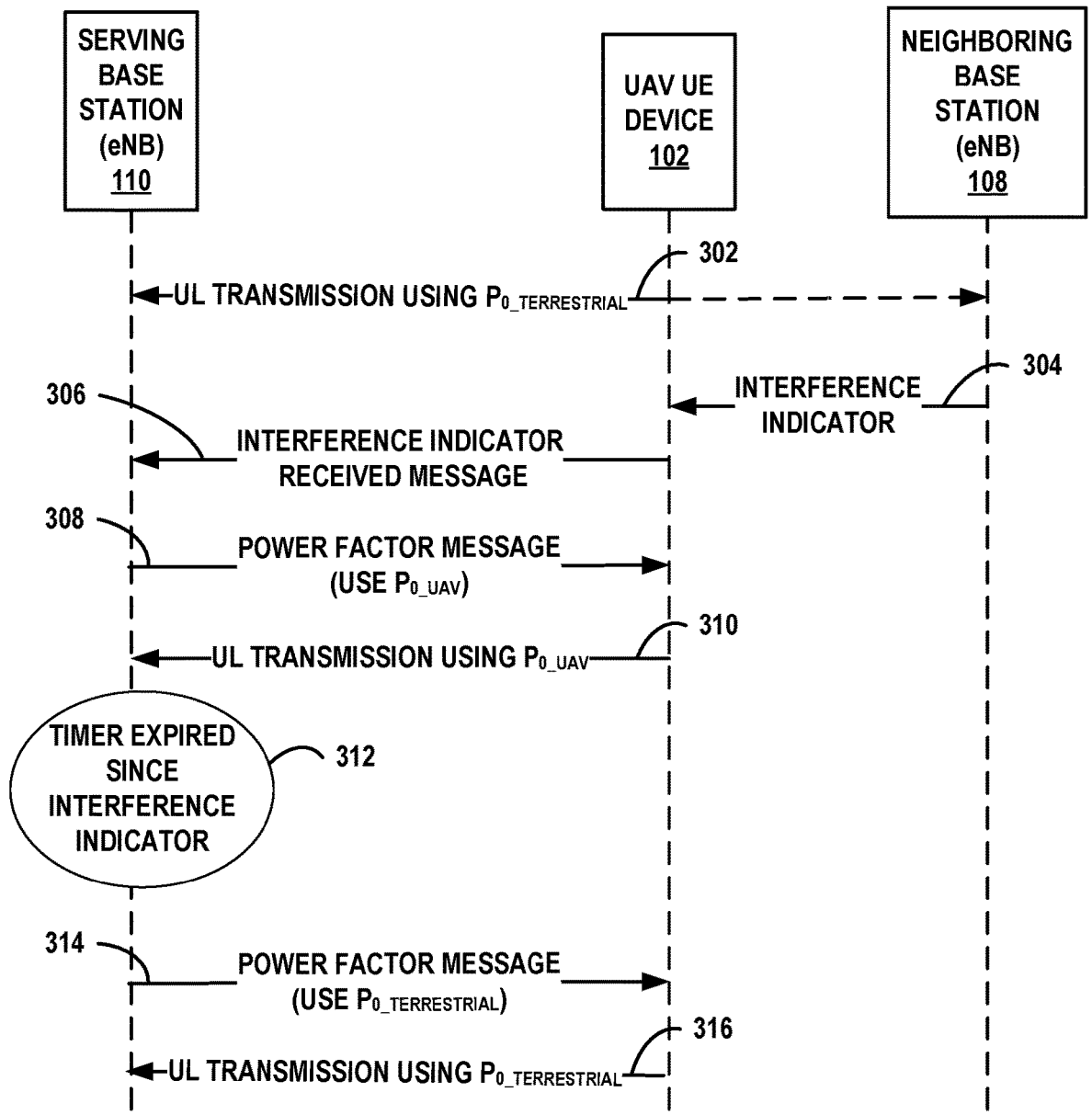
FIG. 3 is an illustration of an example of messaging between the UAV UE device and the serving base station and a neighboring (non-serving) base station.

FIG. 3 is an illustration of an example of messaging between the UAV UE device 102 and the serving base station 110 and a neighboring (non-serving) base station 108. The messaging technique of FIG. 3 is one example of the messaging for managing uplink transmission power for the system of FIG. 1 where the UAV UE device 102 informs the serving base station of receipt of the interference indicator 106. In the interest of clarity and brevity, the example of FIG. 3 may not depict all of the messages transmitted between the entities. Further, one or more of the messages that are shown in FIG. 3 may be omitted in some circumstances. In some situations, the transmissions may be combined with each other and/or substituted in any suitable manner that facilitates the functions discussed herein.

At transmission 302, the UAV UE device 102 transmits an uplink signal to the its serving base station 110 using the standard power factor, $P_{O\_TERRESTRIAL}$. The non-serving neighboring base station 108 detects the uplink signal and determines that it is being transmitted at a power level that warrants transmission of an interference indicator. The determination may be based on several factors.

At transmission 304, the neighboring base station 108 transmits an interference indicator 106. As discussed above, examples of suitable techniques for transmitting the indicator include using an MBSFN channel or SIB. In some situations, the interference indicator 106 indicates a level of interference or a relative level of interference and may indicate one of a plurality of interference values. In one example, the interference indicator includes an interference value based on the Interference-over-Thermal (IoT) experienced at the neighboring base station 108. As discussed below, the UAV UE device may associate the interference value with a power factor value. For example, for each of multiple interference indicator values can be associated with a power factor value such that the UAV UE associates a lower power factor value with a higher interference indicator value and a higher power factor value with a lower interference indicator value.

At transmission 306, the UAV UE device 102 notifies the serving base station 110 that an interference indicator has been received. For example, an interference indicator received message can be transmitted. In situations where the interference indicator 106 indicates a level of interference, the interference indicator received message may include information indicative of the level. Where the interference indicator provides an IoT value, the UAV UE device 102 may provide information indicative of the IoT value where the information may the actual IoT value or some other indicator that assists the serving base station 110 in determining an appropriate power factor value.

At transmission 308, the serving base station 110 transmits a power factor message to the UAV UE device 102 indicating that a reduced power factor should be used for uplink transmission from UAV UE device 102. For the example of FIG. 3, the power factor message includes the reduced power factor value $P_{O\_UAV}$. In some situations, the message also includes the standard power factor value $P_{O\_TERRESTRIAL}$. In one example, the power factor message is transmitted over dedicated signaling or SIB (as currently defined in the 3GPP TS 36.331 and TS 36.321 specs). The power factor, for example can be specified within the UplinkPowerControl Information Element as part of the physical layer configuration (PhysicalConfigDedicated IE) sent on the RRCConnectionReconfiquration message. Therefore, whenever the base station needs to reconfigure the UAV with a new power factor it sends the RRCConnectionReconfiguration message to the UAV with the update.

The power factor may also be sent with System Information (SIB) by incorporating the power factor within the UplinkPowerControlCommon Information elements that is part of the RadioResourceConfigCommon information element. In other situations, the power factor value used may be derived from the power control commands that are conveyed in uplink grants using Downlink Control Indicator (DCI) format 0 or 4. The PUSCH power control field can be utilized where there are specific DCI formats 3 and 3A to send power control bits for semi-persistent scheduling.

In some situations, the power factor values ($P_{O\_UAV}$, $P_{O\_TERRESTRIAL}$) are transmitted in a separate message from the instruction indicating which power factor is to be used by the UAV UE device 102. Also, power factor indicators may be transmitted in instead of the actual power factor values. In one example, the serving base station provides a "delta" or relative value indicator for the reduced power factor that indicates to the UAV UE device a difference of value from the standard power factor value that should be used as the reduced power factor value.

At transmission 310, the UAV UE device 102 transmits uplink signals with power levels determined based on the reduced power factor. The UAV UE device 102 continues to use the reduced power factor for uplink transmissions while monitoring the appropriate channels for the interference indicators. The UAV UE device 102 continues to report all of the interference indicators that are received.

At event 312, an interference timer expires. The serving base station resets the interference timer when an interference indicator is received from the UAV UE device. When the timer expires, the serving base station 110 instructs the UAV UE device 102 to use the standard power factor, $P_{O\_TERRESTRIAL}$ at transmission 314. Therefore, if the time since the last interference indicator exceeds a threshold, the serving base station 110 sends a power factor message indicating that the standard power factor should be used by the UAV UE device 102.

At transmission 316, the UAV UE device 102 transmits an uplink signal to the its serving base station 110 using the standard power factor, $P_{O\_TERRESTRIAL}$.

Therefore, for the example of FIG. 3, the UAV UE device 102 reports the receipt of interference indicators and the serving base station instructs the UAV UE device on which power factor to use and provides the power factor values to the UAV UE device. In other examples, the UAV UE device may autonomously determine to use the reduced power factor.

Figure 4:
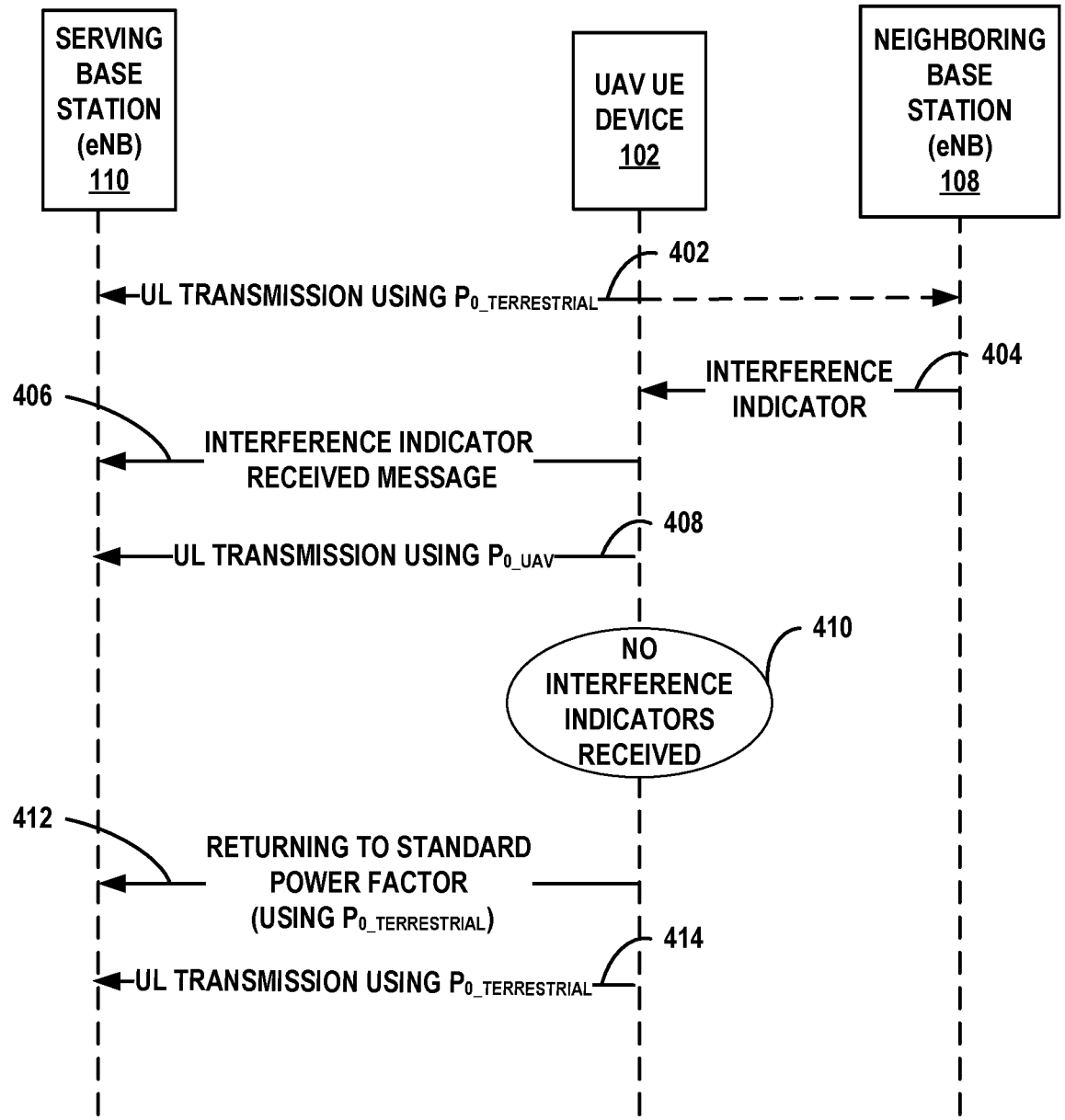
FIG. 4 is an illustration of an example of messaging between the UAV UE device and the serving base station and a neighboring (non-serving) base station where the UAV UE device autonomously uses a reduced power factor after receiving an interference indicator.

FIG. 4 is an illustration of an example of messaging between the UAV UE device 102 and the serving base station 110 and a neighboring (non-serving) base station 108 where the UAV UE device autonomously uses a reduced power factor after receiving an interference indicator. The messaging technique of FIG. 4 is one example of the messaging for managing uplink transmission power for the system of FIG. 1 where the UAV UE device 102 informs the serving base station of receipt of the interference indicator 106 but uses a reduced power factor autonomously, without waiting for instructions form the serving base station. In the interest of clarity and brevity, the example of FIG. 4 may not depict all of the messages transmitted between the entities. Further, one or more of the messages that are shown in FIG. 4 may be omitted in some circumstances. In some situations, the transmissions may be combined with each other and/or substituted in any suitable manner that facilitates the functions discussed herein.

At transmission 402, the UAV UE device 102 transmits an uplink signal to the its serving base station 110 using the standard power factor, $P_{O\_TERRESTRIAL}$. The non-serving neighboring base station 108 detects the uplink signal and determines that it is being transmitted at a power level that warrants transmission of an interference indicator. The determination may be based on several factors.

At transmission 404, the neighboring base station 108 transmits an interference indicator 106. As discussed above, examples of suitable techniques for transmitting the indicator include using an MBSFN channel or SIB. In some situations, the interference indicator 106 indicates a level of interference or a relative level of interference and may indicate one of a plurality of interference values. In one example, the interference indicator includes an interference value based on the Interference-over-Thermal (IoT) experienced at the neighboring base station 108. As discussed below, the interference value can be associated with a power factor value.

At transmission 406, the UAV UE device 102 notifies the serving base station 110 that an interference indicator has been received. For example, an interference indicator received message can be transmitted. For the example of FIG. 4, message at transmission 306 notifies the serving base station 110 that the UAV UE device will be using a reduced power factor $P_{O\_UAV}$ for uplink transmissions. In one example, the transmission over the PUCCH where the PUCCH format is redefined. In another example, the transmission is over the PUSCH. In such an example, the base station may need to grant unlink resources to the UAV UE device for the specific transmission.

Where resources have already been granted for other communication, the transmission may include "piggy-backing" the notification to other data on the PUSCH. In yet another example, the transmission may comprise a PRACH with a specific preamble sequence indicating the reception of the interference indicator.

At transmission 408, the UAV UE device 102 transmits uplink signals with power levels determined based on the reduced power factor. The UAV UE device 102 continues to use the reduced power factor for uplink transmissions while monitoring the appropriate channels for the interference indicators. In some cases, when there is more than one value of reduced power factor for uplink transmissions, the serving base station 110 will inform the UAV UE device 102 ahead of time which value to use when the interference indicator has been received by the UAV UE device 102.

At event 410, the UAV UE device 102 determines that no interference indicators have been received. For example, UAV UE device monitors the SIB of at least selected neighboring base stations and determines that no interference indicators have been transmitted from the neighboring base stations.

At transmission 414, the UAV UE device informs the serving base station that the standard power factor will be used for uplink transmissions. Techniques such as those discussed with reference to transmission 406 may be used.

At transmission 414, the UAV UE device uses the standard power factor, $P_{O\_TERRESTRIAL}$, for transmitting uplink signals.

Figure 5:
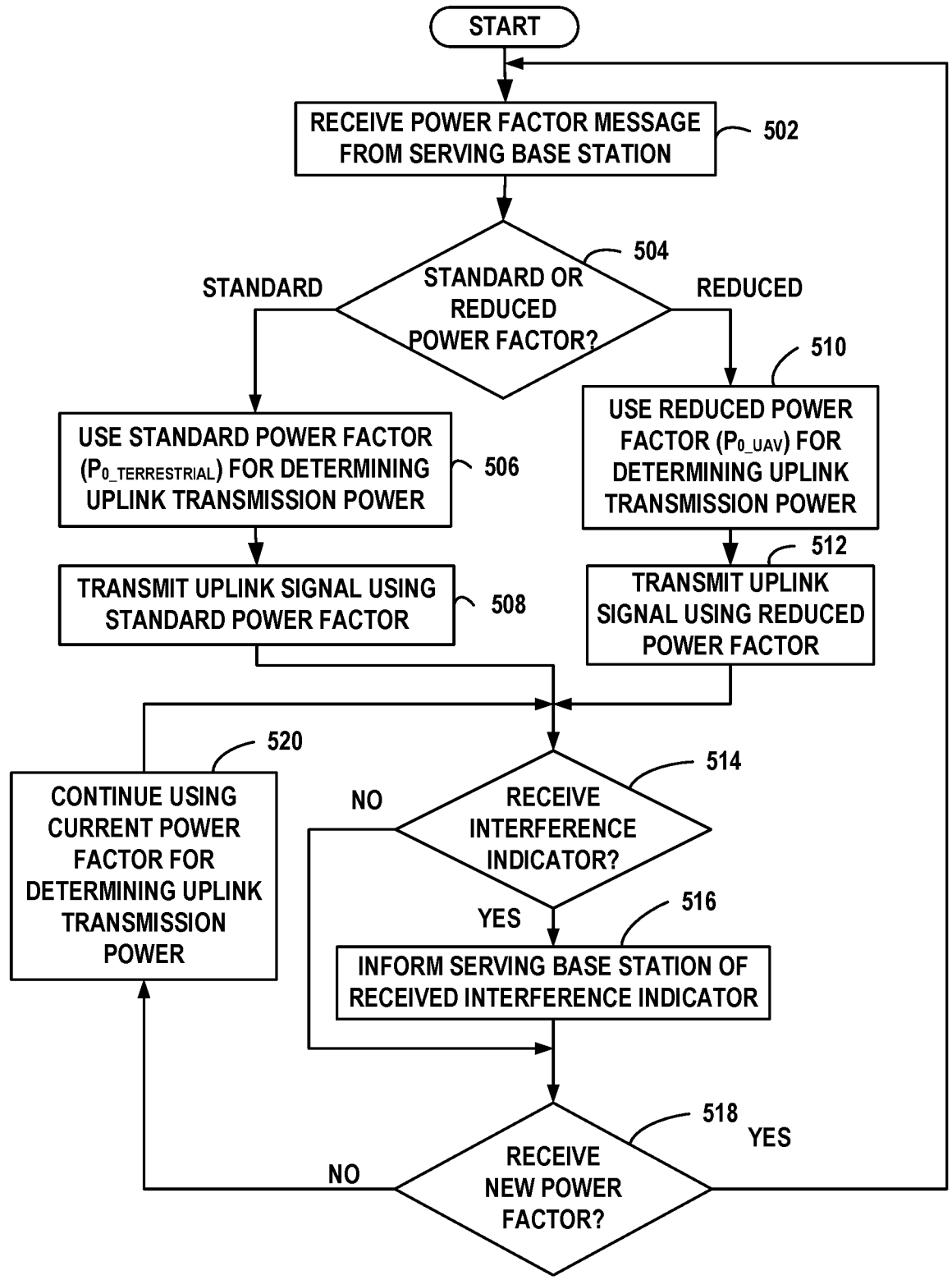
FIG. 5 is a flowchart of an example of a method of power management performed at a UAV UE device.

FIG. 5 is a flowchart of an example of a method of power management performed at a UAV UE device. The method, therefore, can be performed by electronics and code of a device such at the UAV UE devices 102, 111 discussed above. The method is an example where the serving base station instructs the UAV UE device regarding the use of standard and reduced power factors.

At step 502, a power factor message is received from the serving base station 110 where the power factor message indicates the power factor that should be used by the UAV UE device for determining uplink transmission power. Such a message may be transmitted using the techniques discussed with reference to transmission 308. For the example of FIG. 5, the power factor message includes the at least the standard power factor value, the reduced power factor value, and an indication on which power factor should be used.

At step 504, it is determined whether the standard power factor or the reduced power factor should be used. If the standard power factor is to be used, the method continues at step 506. Otherwise, the method continues at step 508.

At step 506, the UAV UE device determines uplink transmission power based on the standard power factor, $P_{O\_TERRESTRIAL}$. The UAV UE device uses the standard power factor in the power level equation in accordance with known techniques to set the uplink power level for the next uplink transmission.

At step 510, an uplink signal is transmitted by the UAV UE device where the power level was determined by the standard power factor. The transmitter in the UAV UE device transmits the signal through the antenna to the serving base station.

If the reduced power factor is to be used, the method continues from step 504 to step 508. At step 508, the UAV UE device determines uplink transmission power based on the reduced power factor, $P_{O\_UAV}$. The UAV UE device uses the reduced power factor in the power level equation in accordance with known techniques to set the uplink power level for the next uplink transmission.

At step 512, an uplink signal is transmitted by the UAV UE device where the power level was determined by the reduced power factor. The transmitter in the UAV UE device transmits the signal through the antenna to the serving base station.

At step 514, it is determined whether an interference indicator has been received. The UAV UE device monitors the appropriate channels of downlink signals transmitted from neighboring base stations to determine if an interference indicator has been transmitted. As discussed above, the interference indicator may be transmitted in an SIB. For the examples herein, the UAV UE device is selective as to which base station or cell is monitored. The UAV UE device may read SIBs from base stations based on downlink measurements of the neighbor cells. Such a technique limits the number of channels that are monitored so that the UAV UE device only reads SIBs from neighbor cells experiencing relatively low pathloss on the downlink. Assuming downlink/uplink reciprocity, those cells with relatively low pathloss are the cells most likely to experience interference from the uplink transmissions of the UAV UE device. If an interference indicator is received, the method continues at step 516 where the serving base station is informed of the receipt of the interference indicator. For the example, the UAV UE device sends an interference indicator received message to the serving base station informing the serving base station of the received interference indicator. If no interference indicator has been received, the method proceeds to step 518.

At step 518, it is determined whether a new power factor has been received. The SIB transmitted from the serving base station is monitored to determine is a new power factor has been received. If no new power factor has been received, the method continues at step 520 where the current power factor is used to determine uplink transmission power. The UAV UE device continues monitoring channels from the neighboring base stations for interference indicators at step 514. If a new power factor has been received, the method returns to step 502.

Figure 6:
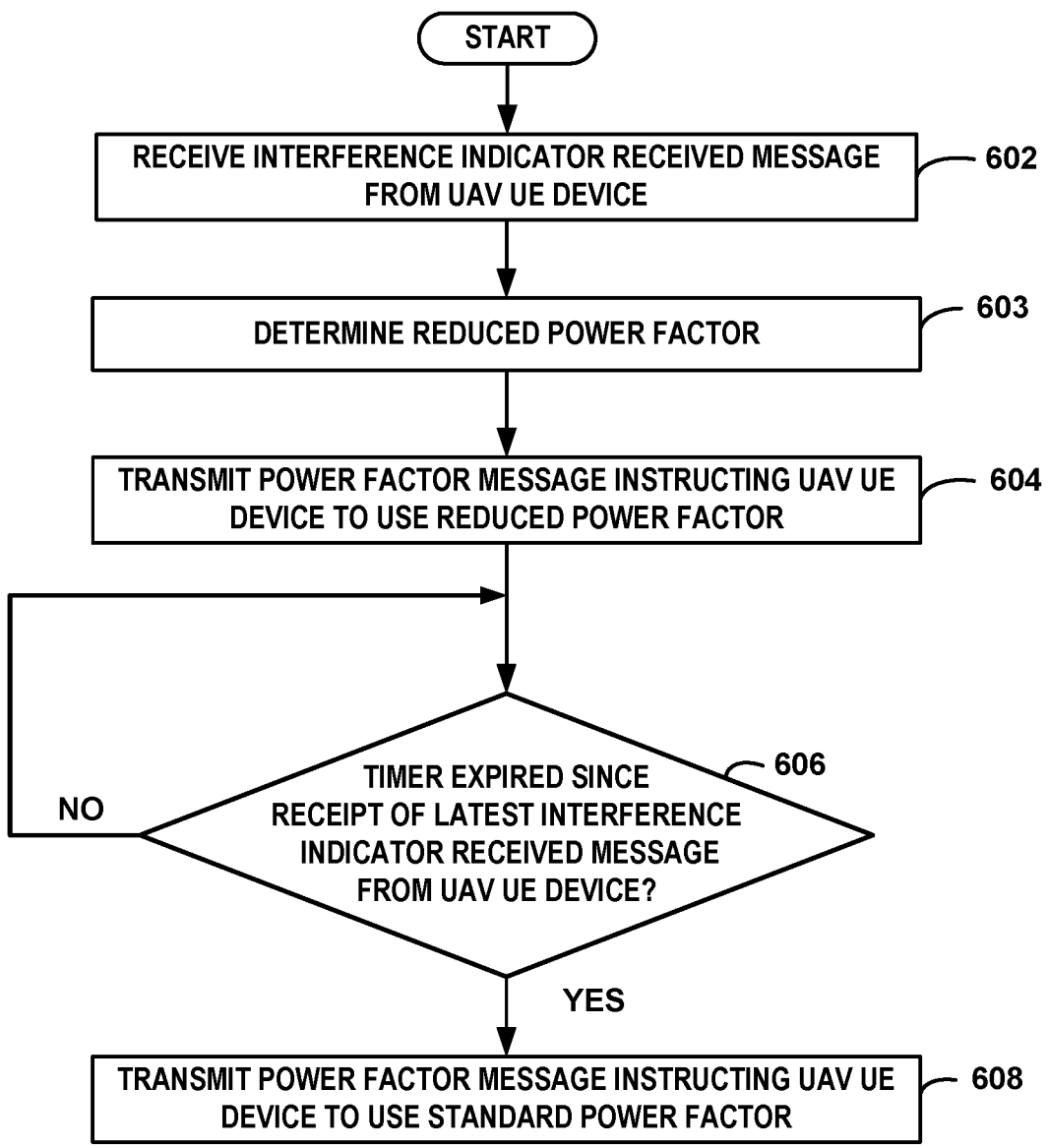
FIG. 6 is a flowchart of an example of a method of power management performed at a serving base station.

FIG. 6 is a flowchart of an example of a method of power management performed at a serving base station. The method, therefore, can be performed by electronics and code of a device such at the serving base station 200, 110 discussed above. The method is an example where the serving base station instructs the UAV UE device regarding the use of standard and reduced power factors.

At step 602, the base station receives an indication that a UAV UE device that it is serving has received an interference indicator. The base station receives the interference indicator received message from the UAV UE device.

At step 603, the base station determines the reduced power factor. The power factor may be based on several factors where some examples include an altitude of the UAV UE device, a number of neighboring cells being impacted and a traffic-load in each cell. Another example includes the QoS of the services operated by the UAV UE device since reducing the power factor will directly impact the service quality. Latency may also be impacted since the UAV UE device may need to retransmit more often. For example, if the UAV is deployed (possibly as a relay node) to serve as a temporary base station in a region, the serving base station to this UAV UE device may limit the reduction in power factor.

At step 604, the base station transmits a power factor message instructing the UAV UE device to use a reduce power factor, $P_{O\_UAV}$, to determine uplink transmission power. In some situations, the power factor message may provide the value of the power factor, $P_{O\_UAV}$. In other situations, the power factor message may provide only an instruction to use a power factor already stored at the UAV UE device. In still other situations, the power factor message may provide a relationship between the reduced power factor and the standard power factor which is stored at the UAV UE device. An indication of the reduced power factor as a percentage of the standard power factor may be provided for example.

At step 606, it is determined whether a timer has expired since the last receipt of an interference indicator received message from the UAV UE device. Therefore, the base station resets the timer when an interference indicator received message is received. If the timer has expired, the method continues at step 608. Otherwise, the serving base station continues to monitor messages from the UAV UE device to determine if the UAV UE device has received an interference indicator. During this time, the UAV UE device continues to use the reduced power factor. Alternatively, the base station may configure the UAV UE device to start a timer when the power factor message sent in step 604. If the UAV UE device does not receive additional instruction for restarting/resetting the timer before the current timer expires, the UAV UE may assume the standard power factor may be used for transmissions. This reduces the additional messaging needed in step 608.

At step 608, the serving base station transmits a power factor message instructing the UAV UE device to use the standard power factor, $P_{O\_TERRESTRIAL}$ The power factor message may include the value of the standard power factor in some circumstances.

Figure 7:
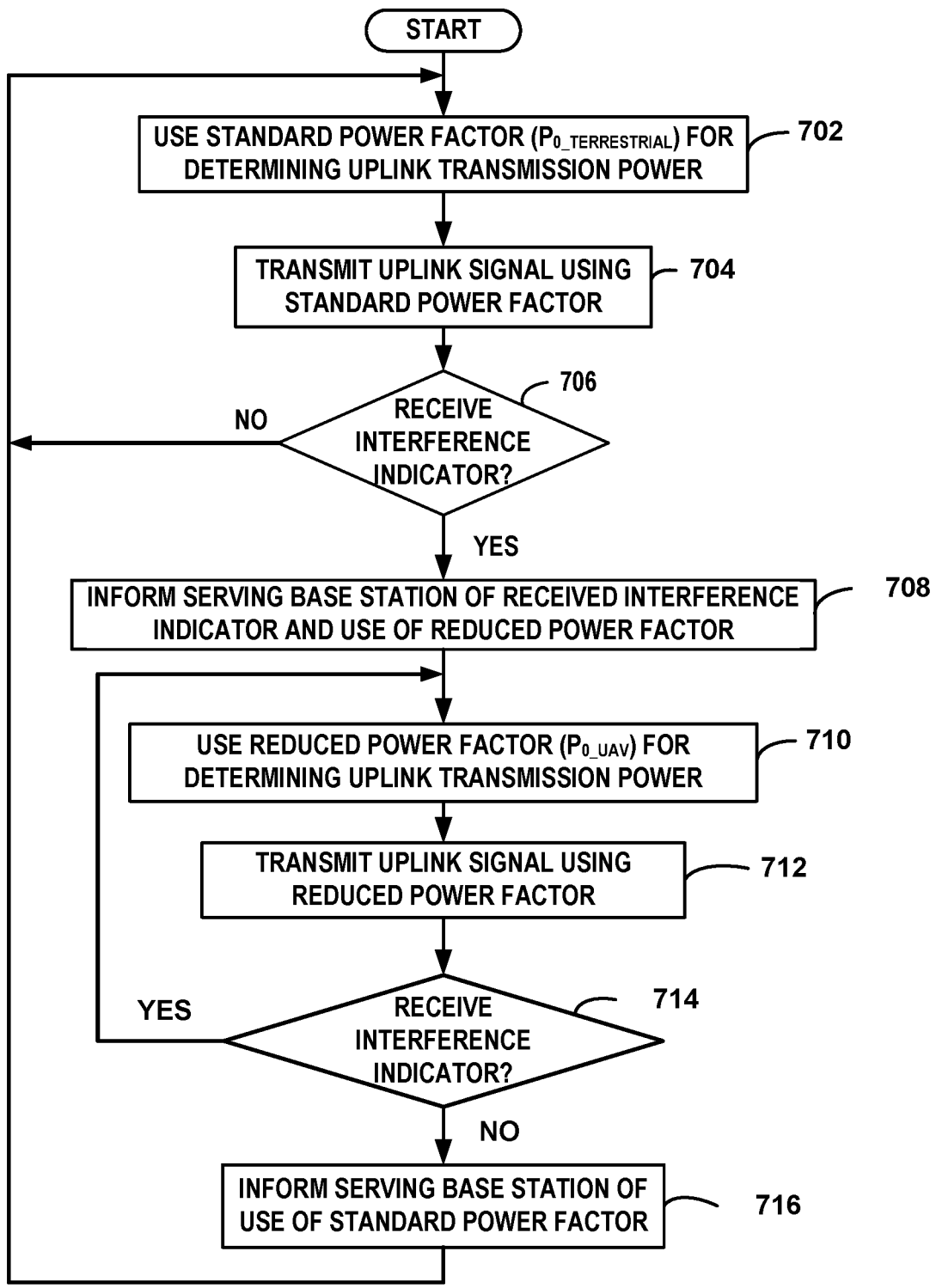
FIG. 7 is a flowchart of another example of a method of power management performed at a UAV UE device.

FIG. 7 is a flowchart of another example of a method of power management performed at a UAV UE device. The method, therefore, can be performed by electronics and code of a device such at the UAV UE devices 102, 111 discussed above. The method is an example where the UAV UE device autonomously uses a reduced power factor.

At step 702, the UAV UE device uses the standard power factor for determining uplink transmission power, $P_{O\_TERRESTRIAL}$. For the example, the UAV UE device operates in accordance with known techniques to apply the standard power factor to determine uplink transmission power levels.

At step 704, the UAV UE device transmits uplink signals having a power based on the standard power factor, $P_{O\_TERRESTRIAL}$.

At step 706, it is determined whether an interference indicator has been received from a neighboring base station. The UAV UE device monitors the appropriate channels in the uplink signals from at least selected neighboring cells to determine if an interference indicator has been transmitted. For the example, the UAV UE device monitors the SIB channels from cells that have sufficiently low path loss as determined from the downlink signals. Assuming downlink/uplink reciprocity, those cells with relatively low pathloss are the cells most likely to experience interference from the uplink transmissions of the UAV UE device. If an interference indicator is received the method proceeds to step 708. Otherwise, the method returns to step 702 and continues to use the standard power factor.

At step 708, the UAV UE device informs the serving base station that the UAV UE is using a reduced power factor, $P_{O\_UAV}$. The UAV UE device transmits a message that indicates that the reduced power factor is being used. Techniques such as those discussed with reference to transmission 406 may be used. In some situations, the message indicates that an interference indicator was received. In other situations, the UAV UE device may identify the reduced power factor being used. This may be useful, for example, where more than one reduced power factor is available.

At step 710, the UAV UE device uses the reduced power factor, $P_{O\_UAV}$, to determine uplink transmission power. The reduced power factor may be a preconfigured value stored at the UAV UE device in some circumstances and in other circumstances, the reduced power factor may be broadcasted in the serving base station's System Information. In other situations, the reduced power factor may be a determined from the standard power factor. For example, the reduced power factor may be a percentage of the standard power factor or may be set level less than the standard power level (e.g., $P_{O\_UAV}=P_{O\_TERRESTRIAL}-3$ dB). The formula used to determine the reduced power factor from the standard power factor may be predetermined. In some cases, the serving base station may dynamically provide the formula.

In some situations, multiple reduced power factors may be available to the UAV UE device. In one example, the neighboring base stations may provide an interference indicator that indicates the level of interference or otherwise provides an indication of the reduction in uplink transmission power that is necessary. For example, the interference indicator may be based on IoT. Therefore, neighboring base stations may send a multi-level interference indicator proportional to the IoT and the power factor may be determined from the interference indicator. In one scheme where X %<Y %<Z %, the reduced power factors may be defined as:

X % rise in IoT→$P_{0\_UAV1}=-86$ dBm
Y % rise in IoT→$P_{0\_UAV2}=-87$ dBm
Z % rise in IoT→$P_{0\_UAV3}=-88$ dBm.

In another example, the percentage rise in IoT may be referenced to a reduction in power factor relative to the standard power factor. Such a scheme may define the reduced power factors as:

X % rise in IoT→$P_{O\_UAV1}=P_{O\_TERRESTRIAL}-3$ dB
Y % rise in IoT→$P_{O\_UAV2}=P_{O\_TERRESTRIAL}-4$ dB
Z % rise in IoT→$P_{O\_UAV3}=P_{O\_TERRESTRIAL}-5$ dB.

At step 712, the UAV UE device transmits uplink signals at power levels based on the reduced power factor.

At step 714, it is determined whether an interference indicator has been received from a neighboring base station. The UAV UE device monitors the appropriate channels in the uplink signals from at least selected neighboring cells to determine if an interference indicator has been transmitted. For the example, the UAV UE device monitors the SIB channels from cells that have sufficiently low path loss as determined from the downlink signals. If an interference indicator has not been received, the method proceeds to step 716. Otherwise, the method returns to step 710 and continues to use the reduced power factor, $P_{O\_UAV}$.

At step 716, the UAV UE device informs the serving base station that it is using the standard power factor. The method then returns to step 702 where the standard power factor, $P_{O\_TERRESTRIAL}$, is used to determine uplink transmission power.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
monitoring, at an unmanned aerial vehicle (UAV) user equipment (UE) device, a downlink wireless channel for an interference indicator transmitted from a non-serving base station;
if the interference indicator has been received, determining an uplink transmission power for transmitting uplink signals to a serving base station based on a reduced power factor resulting in a reduced uplink transmission power level; and
if the interference indicator has not been received, determining the uplink transmission power level based on a standard power factor resulting in a standard uplink transmission power level greater than the reduced uplink transmission power level.

2. The method of claim 1, further comprising:
transmitting an uplink signal to the serving base station at the reduced uplink transmission power level if the interference indicator is received; and
transmitting the uplink signal at the standard uplink transmission power level if the interference indicator is not received.

3. The method of claim 2, further comprising:
informing the serving base station that the interference indicator has been received; and
receiving, from the serving base station, a power factor message indicating that the reduced power factor is to be used for determining uplink transmission power level for transmitting uplink signals to the serving base station.

4. The method of claim 3, further comprising:
informing the serving base station when other interference indicators are received at the UAV UE device; and
using the reduced power factor for determining the uplink transmission power level until another power factor message is received from the serving base station indicating that the standard power factor is to be used to determine the uplink transmission power level.

5. The method of claim 4, wherein the another power factor message comprises the standard power factor.

6. The method of claim 3, wherein the power factor message comprises a power factor indicator at least partially indicating a value of the reduced power factor.

7. The method of claim 6, wherein the power factor indicator indicates the value relative to the standard power factor.

8. The method of claim 2, further comprising:
transmitting a reduce power change indicator to the serving base station, the reduced power change indicator indicating to the serving base station that the UAV UE device is determining the uplink transmission power level using the reduced power factor.

9. The method of claim 8, further comprising:
determining that no interference indicators have been received for a minimum time period;
transmitting a standard power change indicator to the serving base station, the standard power change indictor indicating that the standard power factor is being used to determine the uplink transmission power; and
determining the uplink transmission power based on the standard power factor.

10. An unmanned aerial vehicle (UAV) user equipment (UE) device comprising:
a receiver configured to monitor a downlink wireless channel for an interference indicator transmitted from a non-serving base station;
a controller configured to:
if the interference indicator has been received, determine an uplink transmission power for transmitting uplink signals to a serving base station based on a reduced power factor resulting in a reduced uplink transmission power level; and
if the interference indicator has not been received, determine the uplink transmission power level based on a standard power factor resulting in a standard uplink transmission power level greater than the reduced uplink transmission power level.

11. The UAV UE device of claim 10, further comprising:
a transmitter configured to:
transmit an uplink signal to the serving base station at the reduced uplink transmission power level if the interference indicator is received; and
transmit the uplink signal at the standard uplink transmission power level if the interference indicator is not received.

12. The UAV UE device of claim 11, wherein:
the transmitter is further configured to transmit a power reduction request message informing the serving base station that the interference indicator has been received; and
the receiver is further configured to receive, from the serving base station, a power factor message indicating that the reduced power factor is to be used for determining uplink transmission power level for transmitting uplink signals to the serving base station.

13. The UAV UE device of claim 12, wherein:
the transmitter is further configured to transmit other power reduction request messages informing the serving base station when other interference indicators are received at the UAV UE device; and
the controller is further configured to use the reduced power factor for determining the uplink transmission power level until another power factor message is received from the serving base station indicating that the standard power factor is to be used to determine the uplink transmission power level.

14. The UAV UE device of claim 13, wherein the another power factor message comprises the standard power factor.

15. The UAV UE device of claim 12, wherein the power factor message comprises a power factor indicator at least partially indicating a value of the reduced power factor.

16. The UAV UE device of claim 15, wherein the power factor indicator indicates the value relative to the standard power factor.

17. The UAV UE device of claim 11, wherein:
the transmitter is further configured to transmit a reduced power change indicator to the serving base station, the reduced power change indicator indicating to the serving base station that the UAV UE device is determining the uplink transmission power level using the reduced power factor.

18. The UAV UE device of claim 17, wherein:
the controller is further configured to determine that no interference indicators have been received for a minimum time period and to determine the uplink transmission power based on the standard power factor; and
the transmitter is configured to transmit a standard power change indicator to the serving base station, the standard power change indicator indicating that the standard power factor is being used to determine the uplink transmission power.

19. A method comprising:
receiving, from an unmanned aerial vehicle (UAV) user equipment (UE) device at a serving base station, a power reduction request message indicating that the UAV UE device has received an interference indicator from a non-serving base station;
transmitting a power factor message to the UAV UE device, the power factor message instructing the UAV UE device to use a reduced power factor to determine a reduced uplink transmission power level for transmitting uplink signals to the serving base station, the reduced uplink transmission power level being less than a standard uplink transmission power level based on a standard power factor.

20. The method of claim 19, further comprising:
monitoring an elapsed time from receiving the power reduction request message has occurred without receiving other power reduction request messages from the UAV UE device; and
when the elapsed time exceeds a threshold, transmitting another power factor message instructing the UAV UE device to use the standard power factor to determine the standard uplink transmission power level for uplink transmission to the serving base station.

21. The method of claim 20, wherein the power factor message comprises a power factor indicator at least partially indicating a value of the reduced power factor.

22. The method of claim 21, wherein the power factor indicator indicates the value relative to the standard power factor.

* * * * *